Patented Nov. 8, 1949

2,487,382

UNITED STATES PATENT OFFICE 2,487,382

UREA DERIVATIVES AND PROCESS OF MAKING SAME

Richard Sallmann, Gelterkinden, Switzerland, assignor to Ciba Limited, a Swiss firm No Drawing. Application April 5, 1946, Serial No. 659,861. In Switzerland April 18, 1945

11 Claims. (Cl. 260—295)

According to this invention new urea derivatives are made by converting a methylene compound obtainable with the aid of formaldehyde in the presence of an acid from a condensation product of an amide with formaldehyde and a urea compound containing the atomic grouping —NH—CO—NH—, into a formaldehyde derivative containing at least one

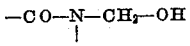

or

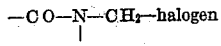

group, and exchanging the hydroxyl group of at least one

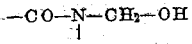

group or the halogen atom of at least one

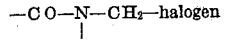

group for a radical imparting solubility in water.

The introduction of the radical imparting solubility in water may be carried out in a single stage, instead of in two stages, by condensing the condensation product used as starting material, or the methylene compound thereof, with formaldehyde and a suitable compound enabling the radical imparting solubility in water to be introduced.

The condensation products of amides, such as acetamide, caprylic acid amide, lauric acid amide or stearic acid amide, with formaldehyde and urea compounds containing the atomic grouping —NH—CO—NH—, particularly products of the formula

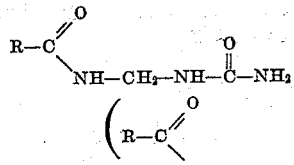

represents the acyl radical of a carboxylic acid with at least 2 carbon atoms), can be obtained, for example, by the process of French specification No. 858,510.

The methylene compounds coming into consideration as starting materials for the present process, and which are derived from the condensation products described in the preceding paragraph, can be obtained from these condensation products by condensation with formaldehyde in the presence of an acid, for example, with the addition of sulfuric acid, and advantageously by heating for a short time at the boil a solution of the starting material in glacial acetic acid with the addition of a small quantity of concentrated sulfuric acid.

The conversion of a

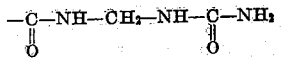

group into a

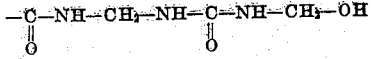

group may be brought about, for example, by heating a condensation product from an amide, formaldehyde and urea with formaldehyde with the addition of a substance of alkaline reaction, for example, in the presence of triethylamine.

For the introduction of at least one

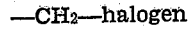

group the starting material may be treated, for example, at 50–60° C., with formaldehyde and a hydrogen halide, advantageously in the presence of a water-insoluble inert solvent such as benzene. 1 molecular proportion of formaldehyde may be used for every amide-hydrogen atom. Instead of formaldehyde and a hydrogen halide there may be used an $\alpha{:}\alpha'$-dihalogendimethyl ether, for example, $\alpha{:}\alpha'$-dichlorodimethyl ether. For this purpose the starting material may be heated with the $\alpha{:}\alpha'$-dihalogendimethyl ether, for example at 90–100° C., until hydrogen halide ceases to be split off. For this reaction it is not necessary to use a solvent. By the action of formaldehyde and a hydrogen halide or of an $\alpha{:}\alpha'$-dihalogendimethyl ether on a starting material containing an atomic grouping

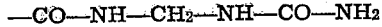

a methylene compound is first formed, which is then converted by further reaction with the said agent into an N-halogenmethyl compound.

The N-methylol compounds and N-halogen methyl compounds obtainable by the invention are very reactive owing to the presence of a

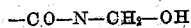

or

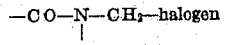

group, and are therefore valuable intermediate products. Water-soluble final products can be obtained from these intermediate products, for example, as follows:

By the action of tertiary amines, such as pyridine, triethylamine or dimethyl-cyclohexylamine, or of primary or secondary amines the N-halogen-methyl compounds of the invention are converted into products containing quaternary groups or into compounds containing radicals carrying amino groups. By treatment with a thiourea which is unsubstituted as to a hydrogen on one of the nitrogen atoms of said thioureas, that is, capable of forming isothioureas, or with dicyandiamide or similar compounds, the halogen atoms of the N-halogenmethyl compounds can be exchanged for the corresponding radicals of the aforesaid compounds, which radicals impart solubility in water when in salt form. The reactions of the aforesaid kind, for example, with thiourea or dicyandiamide are advantageously conducted in the presence of a solvent such as acetone, for example, at 40–60° C.

It is also possible by reaction with salts of halogen-carboxylic acids to exchange the reactive halogen atoms for ester-like radicals corresponding to the halogen-carboxylic acids used, groups imparting solubility in water being introduced into the said radicals.

For converting the N-methylol compounds of the invention into water-soluble derivatives the said compounds may be caused to react, for example, with thioureas unsubstituted as to a hydrogen on one of the nitrogen atoms of said thioureas, that is, capable of forming isothioureas, in the presence of an acid and advantageously with the addition of a solvent, or alternatively with water-soluble salts of tertiary amines, for example, with pyridine hydrochloride. The preferred variant of the present invention consists in the introduction of basic groups which impart solubility in water. It must be remembered that final product with such groups are cation active and have the advantage over anion active compounds of comparable constitution of being more readily absorbed by the cellulose fibers which as a rule are negatively charged. It is therefore possible to bring larger quantities, comparatively speaking, of the cation active compounds onto the cellulose fibers. In this manner special effects may be obtained, a soft feel, for instance. Cation-active products are also especially useful in making articles water-repellent, especially if they contain an aliphatic radical with at least 16 carbon atoms.

Cation-active products are particularly easy to obtain by condensing a formaldehyde derivative selected from the group consisting of N-methylol compounds of substituted ureas of the formula

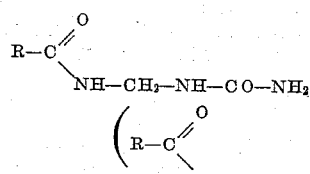

being the acyl radical of a carboxylic acid with at least 2 carbon atoms), in which compounds a methylene bridge replaces one amide-hydrogen atom of each of two substituted urea molecules of the aforesaid formula, and N-chloro-methyl compounds of substituted ureas of the aforesaid formula in which compounds a methylene bridge replaces one amide-hydrogen atom of each of two substituted urea molecules of the aforesaid formula with a solubilizing agent containing at least one nitrogen atom directly linked to at least one carbon atom and selected from the group consisting of thio-ureas unsubstituted as to a hydrogen on one of the nitrogen atoms of said thioureas, that is, capable of forming isothioureas, secondary and tertiary amines, cyanamide and dicyandiamide, by mixing the reactants, an acid being added in case no hydrogen halide is split off in the condensation process. Substituted ureas of the formula

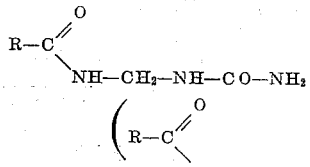

being the acyl radical of a carboxylic acid with at least 2 carbon atoms), in which ureas a methylene bridge replaces one amide-hydrogen atom of each of two substituted urea molecules of the aforesaid formula are, for instance, products of the formula

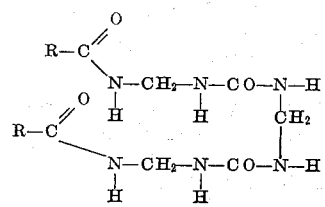

wherein

has the meaning given above. Products described in the preceding two sentences may also be designated as methylene compounds containing at least twice the atomic grouping

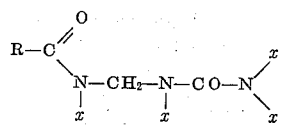

wherein

is the acyl radical of a carboxylic acid with at least 2 carbon atoms, a methylene bridge —CH$_2$— replacing one $x$ of each of two atomic groupings of the formula given above and connecting in this way two atomic groupings with one another, the remaining $x$-groups, in so far as any remain, being hydrogen. This type of description may be used to designate the above mentioned N-chloromethyl compounds in the following manner: methylene compounds containing at least twice the atomic grouping

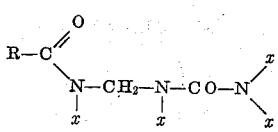

wherein

has the meaning given above, and wherein at least one $x$ represents —CH$_2$—Cl, a methylene bridge —CH$_2$— replacing one $x$ of each of two atomic groupings of the formula given above and connecting in this way two atomic groupings with one another, the remaining $x$-groups being hydrogen. The corresponding N-methylol compounds may be defined in a similar manner by substituting —CH₂—OH for —CH₂—Cl.

The above mentioned methylolamides and methyl chloride compounds are closely related substances. All are formaldehyde compounds with comparatively loosely bound formaldehyde which, consequently, can easily be split off. A common property of all of these formaldehyde derivatives is their easy decomposition.

For the purpose of introducing a group imparting solubility in water in a single stage instead of in two stages, as hereinbefore referred to, there may be used as compounds which enable a group imparting solubility in water to be introduced, for example, water-soluble salts of tertiary amines, hydrohalides of thiourea. For this purpose the reaction components are heated, advantageously with the addition of a solvent, such as glacial acetic acid. A product obtainable by the instant process can be designated as a methylene compound containing at least twice the atomic grouping

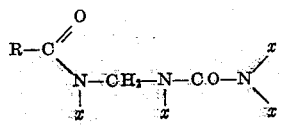

wherein

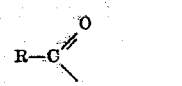

is the acyl radical of a carboxylic acid with at least 2 carbon atoms and wherein at least one $x$ represents —CH₂—R₁ (R₁ being the radical of a solubilizing agent containing at least one nitrogen atom directly linked to at least one carbon atom and selected from the group consisting of salts of thioureas unsubstituted as to a hydrogen on one of the nitrogen atoms of said thioureas, that is, capable of forming isothioureas, salts of secondary and of tertiary amines, cyanamide and dicyandiamide), a methylene bridge —CH₂— replacing one $x$ of each of two atomic groupings of the formula given above and connecting in this way two atomic groupings with one another, the remaining $x$-groups being hydrogen, which compound in the form of a hydrogen halide salt is soluble in water, and is decomposed by boiling with dilute hydrochloric acid. The products of the invention, obtained by reaction with thiourea, contain the radical

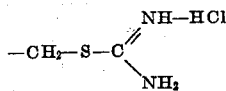

as group imparting solubility in water.

From pyridine there may be obtained products with the atom grouping

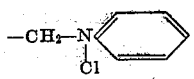

and from triethylamine products which contain at least once the radical

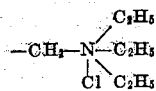

The products obtainable by the invention may be used, depending on the choice of the starting materials, inter alia as assistants, for example in the textile, leather and paper industries. The water-soluble products which contain an aliphatic or cyclo-aliphatic radical of high molecular weight, more particularly such a radical having 12 carbon atoms, are especially suitable, for example, as wetting or softening agents, or as agents for rendering textiles, especially cellulosic material, water-repellent, a subsequent heat treatment of the dried textiles being advantageously applied in the latter case. The aforesaid agents may be used alone or in conjunction with ether substances customarily employed in conjunction with textile assistants, for example, salts of weak acids. For the purpose of rendering textiles water-repellent there are especially suitable the water-soluble products of the invention which contain at least one saturated aliphatic radical having at least 16 carbon atoms, especially one having 18 carbon atoms.

The following examples illustrate the invention, the parts being by weight unless otherwise stated and the relationship of parts by weight to parts by volume being the same as that of the kilogram to the liter:

*Example I*

35.5 parts of the condensation product from stearic acid methylolamide and urea, which has the formula

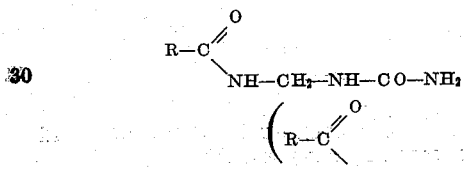

being the acyl radical of commercial stearic acid) and which may be obtained, for example, by the process of French specification No. 858,510, are dissolved in 350 parts of glacial acetic acid. 1.7 parts of paraformaldehyde are first introduced while stirring. Then 5 parts of concentrated sulfuric acid are added and the clear solution is heated at the boil in a reflux apparatus for 90 minutes. The reaction product, which is a methylene compound of the formula

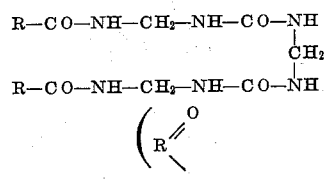

being the acyl radical of commercial stearic acid) may be isolated in the form of a yellowish colored powder by introducing the reaction mixture into water. There is no doubt as to this powder being a methylene compound of a substituted urea.

Compounds of the formula

or

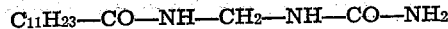

can in the same manner be converted into methylene compounds of the formulae

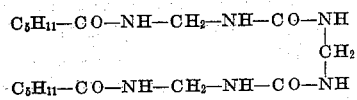

or

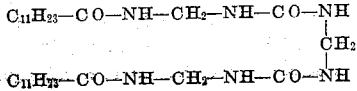

Example II 14.4 parts of the methylene compound obtained as described in the first paragraph of Example I are dissolved in 300 parts of benzene. After the addition of 4 parts of paraformaldehyde, dry hydrogen chloride gas is introduced, while stirring, for 1 hour at 50–60° C. The supernatant liquid is poured off from the water which settles to the bottom, the benzene solution is dried with calcium chloride, and the benzene is removed by distillation in vacuo at 50° C. The residue, which is a chloromethyl derivative of the starting material is then triturated with 11 parts of pyridine, gently heated, and stirred with acetone. After the separation of the mother liquor, the reaction product freed from volatile constituents is a pale yellow colored and somewhat sticky mass, which dissolves in water to give a clear solution. It is a methylene compound containing at least twice the atomic grouping

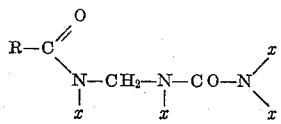

wherein

is the acyl radical of commercial stearic acid and wherein at least one $x$ represent

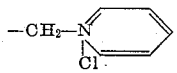

a methylene bridge —CH$_2$— replacing one $x$ of each of two atomic groupings of the formula given above and connecting in this way two atomic groupings with one another, the remaining $x$-groups being hydrogen.

The methylene compounds with the radicals

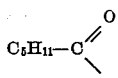

or

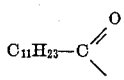

mentioned in Example I can in the same manner be converted into the corresponding chloromethyl compounds to which operation the conversion into the quaternary pyridinium compounds may follow.

In the following examples the expression chloromethyl derivative obtained as described in Example II is meant to refer to the chloromethyl derivative which is described at the beginning of Example II.

Example III 3 parts of the chloromethyl derivative obtained as described in Example 2 are dissolved in ether. 3 parts of triethylamine are added. After the whole has been allowed to stand for 1 hour at room temperature the ether and excess of triethylamine are removed by distillation at a low temperature in vacuo. The new reaction product which constitutes the residue is a soft mass which is soluble in water. It is a methylene compound containing at least twice the atomic grouping

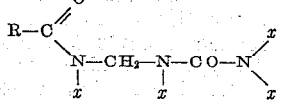

wherein

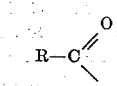

is the acyl radical of commercial stearic acid and wherein at least one $x$ represents

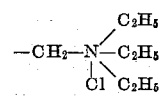

a methylene bridge —CH$_2$— replacing one $x$ of each of two atomic groupings of the formula given above and connecting in this way two atomic groupings with one another, the remaining $x$-groups being hydrogen.

Example IV 3 parts of the chloromethyl derivative obtained as described in Example II are dissolved in 30 parts of acetone, and the solution is filtered to remove small quantities of impurities. 1.5 parts of thiourea are strewn into the mixture while stirring at room temperature. After 1 hour, the precipitated solid reaction product is separated from the mother liquor, and adherent acetone is removed under reduced pressure. A white pulverulent mass is obtained, which after the addition of a little alcohol dissolves to give a clear solution in water. The aqueous solutions decompose in a short time upon being heated. In this way there is obtained a methylene compound containing at least twice the atomic grouping

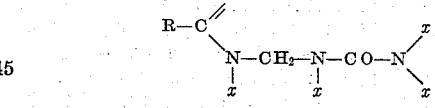

wherein

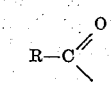

is the acyl radical of commercial stearic acid and wherein at least one $x$ represents

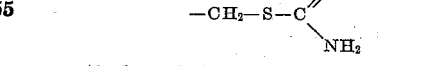

a methylene bridge —CH$_2$— replacing one $x$ of each of two atomic groupings of the formula given above and connecting in this way two atomic groupings with one another, the remaining $x$-groups being hydrogen.

Example V 1 part of the chloromethyl derivative obtained as described in Example II is heated with 0.8 part of dimethylcyclohexylamine on the steam bath for a short time. A test portion will then dissolve in water to give a clear solution. After removing the excess of base by triturating with acetone the reaction product freed from adherent solvent is a soft yellowish colored mass.

Example VI 10 parts of the condensation product from stearic acid methylolamide and urea are heated with 30 parts of α:α'-dichlorodimethyl ether for 2 hours, while stirring at 100–110° C. The excess of α:α'-dichlorodimethyl ether is then removed by distillation in vacuo at the same temperature. The residue is stirred with 7.2 parts of pyridine, gently heated, and the excess of pyridine is removed by triturating with acetone. The residue, after removing the acetone in vacuo, is a somewhat soft yellowish colored mass which is soluble in water.

*Example VII*

3.6 parts of the condensation product from stearic acid methylolamide and urea are dissolved in 5 parts of pyridine, and heated with 0.4 part of paraformaldehyde for 1 hour, while stirring, on the steam bath. After removing the pyridine by distillation in vacuo, the resulting methylol compound is dissolved in 20 parts of alcohol. 0.9 part of thiourea is strewn, while stirring, into the alcoholic solution, and, after the addition of 6 parts by volume of alcoholic hydrochloric acid of 8 per cent strength, the whole is heated for 1 hour at 50–60° C. After removing the alcohol by distillation the thiourea compound remains behind in the form of a white powder, which dissolves in water to give a turbid solution.

*Example VIII*

2 parts of the chloromethyl compound described in Example II are dissolved in 40 parts by volume of acetone. At a temperature of 30–40° C. 1.7 parts of finely pulverized dicyandiamide are slowly added while stirring. After one hour the reaction is completed. The acetone is distilled off and a white powder is obtained which dissolved in water to give a clear solution and foam.

*Example IX*

2 parts of the chloromethyl compound described in Example II are dissolved in 40 parts by volume of acetone. A solution of 1.5 parts of piperidine in acetone is added and the whole is stirred for one hour at 30–40° C. When the acetone is distilled off, a yellowish colored soft mass is obtained which after the addition of some hydrochloric acid is soluble in water.

*Example X*

A textile is rendered water-repellent in the following manner: 22 parts of the pyridine addition product obtained as described in the first paragraph of Example II and 11 parts of crystalline sodium acetate are dissolved in 1000 parts of water and 100 parts of a cotton fabric (wind-proof jacket material) are treated for 10 minutes at 60° C. with the resulting solution. The fabric is squeezed and then dried at 60° C., and heated for 5 minutes at 140° C. The fabric so treated is water-repellent, and the dressing is not impaired to any considerable extent by washing.

What I claim is:

1. Process for the manufacture of a urea derivative which comprises condensing a N-chloromethyl compound of a substituted urea of the formula

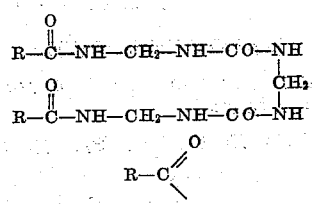

being the acyl radical of a fatty acid with at least 12 carbon atoms, said N-chloromethyl compound containing at least four N-chloromethyl radicals, with a solubilizing agent containing at least one nitrogen atom directly linked to at least one carbon atom and selected from the group consisting of thioureas unsubstituted as to a hydrogen on one of the nitrogen atoms of said thioureas, that is, capable of forming isothioureas, and secondary and tertiary amines, cyanamide and dicyandiamide, by mixing the reactants in a solvent.

2. Process for the manufacture of a urea derivative which comprises condensing a N-chloromethyl compound of a substituted urea of the formula

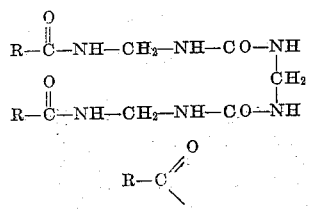

being the acyl radical of a fatty acid with at least 16 carbon atoms, said N-chloromethyl compound containing at least four N-chloromethyl radicals, with thiourea by mixing the reactants in a solvent.

3. Process for the manufacture of a urea derivative, which comprises condensing a N-chloromethyl compound of a substituted urea of the formula

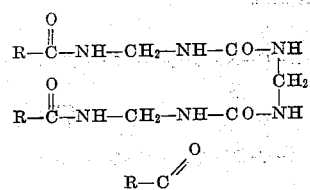

being the acyl radical of commercial stearic acid, said N-chloromethyl compound containing at least four N-chloromethyl radicals, with thiourea by mixing the reactants in a solvent.

4. Process for the manufacture of a urea derivative, which comprises condensing a N-chloromethyl compound of a substituted urea of the formula

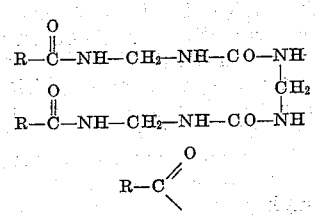

being the acyl radical of commercial stearic acid, said N-chloromethyl compound containing at least four N-chloromethyl radicals, with pyridine by mixing the reactants in a solvent.

5. Process for the manufacture of a urea derivative, which comprises condensing a N-chloromethyl compound of a substituted urea of the formula

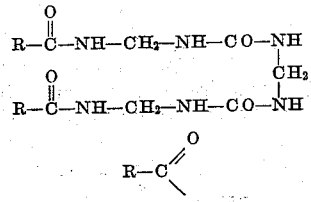

being the acyl radical of commercial stearic acid, said N-chloromethyl compound containing at least four N-chloromethyl radicals, with triethylamine by mixing the reactants in a solvent.

6. A methylene compound containing the atomic grouping

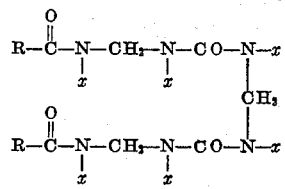

wherein

is the acyl radical of a carboxylic acid with at least 12 carbon atoms and wherein at least four $x$'s represent $-CH_2-R_1$, $R_1$ being the radical of a solubilizing agent containing at least one nitrogen atom directly linked to at least one carbon atom and selected from the group consisting of salts of thioureas unsubstituted as to a hydrogen on one of the nitrogen atoms of said thioureas, that is, capable of forming isothioureas, and salts of secondary and of tertiary amines, cyanamide and dicyandiamide, each remaining $x$ being hydrogen.

7. A methylene compound containing the atomic grouping

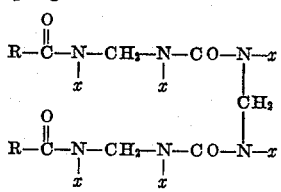

wherein

is the acyl radical of a fatty acid with at least 16 carbon atoms and wherein at least four $x$'s represent $-CH_2-R_1$, $R_1$ being the radical of a solubilizing agent containing at least one nitrogen atom directly linked to at least one carbon atom and selected from the group consisting of salts of thioureas unsubstituted as to a hydrogen on one of the nitrogen atoms of said thioureas, that is, capable of forming isothioureas, and salts of secondary and of tertiary amines, cyanamide and dicyandiamide, each remaining $x$ being hydrogen.

8. A methylene compound containing the atomic grouping

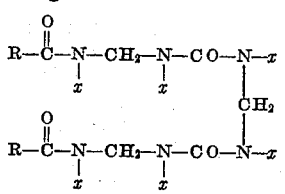

wherein

is the acyl radical of a fatty acid with at least 16 carbon atoms and wherein at least four $x$'s represent

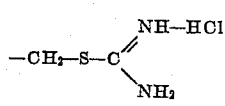

each remaining $x$ being hydrogen.

9. A methylene compound containing the atomic grouping

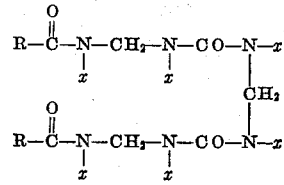

wherein

is the acyl radical of commercial stearic acid and wherein at least four $x$'s represent

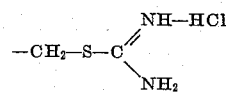

each remaining $x$ being hydrogen.

10. A methylene compound containing the atomic grouping

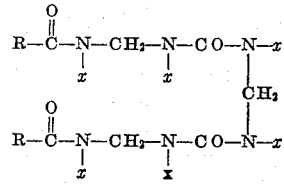

wherein

is the acyl radical of commercial stearic acid and wherein at least four $x$'s represent

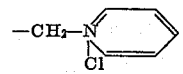

each remaining $x$ being hydrogen.

11. A methylene compound containing the atomic grouping

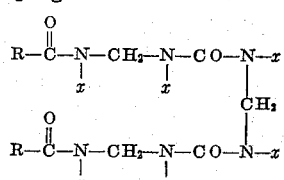

wherein

is the acyl radical of commercial stearic acid and wherein at least four $x$'s represent

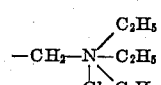

each remaining $x$ being hydrogen.

RICHARD SALLMANN.

REFERENCES CITED

The following references are of record in the file of this patent:

UNITED STATES PATENTS

| Number | Name | Date |
|---|---|---|
| 2,338,177 | Graenacher et al. | Jan. 4, 1944 |
| 2,338,178 | Graenacher et al. | Jan. 4, 1944 |
| 2,345,109 | Graenacher et al. | Mar. 28, 1944 |